United States Patent Office 3,497,735
Patented Feb. 24, 1970

3,497,735
BEARING AND BEARING SHIELD ARRANGE-
MENT FOR DYNAMOELECTRIC MACHINES
AND METHOD OF MAKING
Artur Diederichs, Fritz Anders, and Wolfgang Pieper,
Wurzburg, Germany, assignors to Siemens Aktienge-
sellschaft, Erlangen, Germany, a corporation of Ger-
many
Filed July 22, 1966, Ser. No. 567,202
Claims priority, application Germany, July 24, 1965,
S 98,405
Int. Cl. H02k 15/00
U.S. Cl. 310—42                14 Claims

ABSTRACT OF THE DISCLOSURE

An electric rotary machine assembled by high-speed metal forming includes a shaft, a rotor mounted on the shaft, a magnetically active stator of ring-shaped configuration coaxially surrounding the rotor, and two bearing shields located on axially opposite sides of the stator and having respective bearings in which the shaft is journalled, each of the bearing shields comprises a cylindrical rim portion peripherally overlapping a marginal zone of the stator and being deformed peripherally at the zone around and toward the stator so as to be in form-locking engagement therewith and form a rigid deformation bond together therewith, whereby attachment of the shields to the stator by high-speed metal forming is afforded.

---

Our invention relates to electric motors and the like machines of a design suitable for being assembled, at least partially, by a high-speed metal-forming method, preferably the magnetic-pulse forming process.

High-speed metal-forming methods are processes by means of which the shaping of metallic workpieces is effected at considerably higher speeds than with the conventional machining or other fabrication. Known high-speed forming methods, aside from metal forming by pulsed magnetic fields, are the hydro-electric forming process, and the explosion process, the latter requiring ignition of an explosive charge. A particular advantage of such processes resides in the fact that the individual parts to be assembled and joined need not be machined to accurately fitting dimensions. The assembling of an electric motor with the aid of a high-speed forming method is preferably performed by placing coarsely prefabricated parts and/or subassemblies with the aid of a jig into a preferably vertically mounted clamping device, together with a tubular assembly structure of sheet metal and any necessary spacers, and thereafter subjecting the tubular housing to high-speed forming process in order to draw and deform it over the bearing shields and the stack of stator laminations. In this manner, the motor can be completely assembled in a single fabricating operation.

Once completed, a motor made by this method cannot be disassembled without destroying at least its housing. In many cases, however, some motor components subject to wear, for example commutators and contact brushes, must remain accessible for maintenance. To permit taking advantage in such cases of the high-speed forming methods, it has been proposed to partially assemble and join one bearing shield with the active stator portion with the aid of a mounting tube which has an auxiliary centering ring for fastening the other bearing shield. It is then not necessary to subsequently machine the housing for attaching and accurately fitting the other bearing shield. Consequently considerable advantages in comparison with the conventional production methods are still attained.

It is an object of our invention to improve the construction of an electric motor with a view to facilitate assembling and producing it with the aid of a high-speed metal-forming process, particularly the magnetic-pulse forming method.

Another, conjoint object of the invention is to provide a motor, suitable for production by a high-speed metal-forming method, which is distinguished by a prolonged lifetime of useful operation as well as by simplicity of the individual components from which it is to be assembled by the forming method.

Still another object of the invention is to devise a motor that readily lends itself to production by high-speed metal forming, but affords mounting any commutator or brushes at accessible locations.

To achieve these objects and in accordance with our invention, we design an electric motor, to be assembled, at least partially, with the aid of the high-speed metal-forming method, so as to virtually eliminate the conventional housing. In lieu thereof, we place the cylindrical rim portions of the preferably cup-shaped bearing shields upon the active portion of the stator, particularly upon the stack of stator laminations, a direct seating engagement being preferred. Thus assembled, the bearing shields are attached to the stator portion by high-speed metal forming, preferably magnetic-pulse forming. Both bearing shields of the motor may be assembled and fastened concurrently or one after the other.

Preferably, the active stator portion is given uneven peripheral surface areas upon which the bearing shields are seated in the above-described manner. For this purpose, the marginal zone of the stator may be provided with one or several grooves, striations, bores or other recesses. Another way of providing for the desired unevenness in the marginal zone of the stator is to give the end sheets of the stator stack, normally being thicker than the interior laminations, a slightly larger diameter than the other sheet-metal laminations of the stator. In many cases, the natural roughness of the stator surface suffices, especially if one or more welds or other protrusions are present on this surface.

The bearings of the motor may be fastened to the respective bearing shields prior to performing the high-speed metal-forming process. When employing cylindrical bearings, such as normal glide bearings, it is of advantage to rivet these bearings into the bearing shields. Since the bearings together with the shields are stuck upon the motor shaft prior to applying the forming method, the process results in an accurate coaxial alignment of the bearings.

In a preferred embodiment of the invention, the cup-shaped bearing shields are provided with hollow cylindrical extensions in which the bearings are likewise fastened by high-speed metal forming. The fastening of the bearings may be effected directly or indirectly through damping means, such as rings, supporting bodies or the like. Cylindrical bearings as well as calotte-type bearings are applicable. To preserve the adjustability of calotte bearings, the calotte, or the interior of the hollow cylindrical projection of the bearing shield, is provided with a layer or film of lubricant. It has been found that, due to the high forming speed of the metal-forming method, such a film of oil or fat will not be pressed out of its location.

The bearings to be fastened in the bearing shield by high-speed metal forming are preferably also assembled with the aid of a liquid or solid medium. This reliably prevents the occurrence of edging or excessive concentration of pressure at the edges. The use of a liquid or solid lubricant is advisable for this purpose. Since the bearings, prior to assembling the motor, are accurately adjusted on the motor shaft, the axial alignment of the bearings is not impaired by the subsequent high-speed metal-forming method.

When completing the motor with the aid of high-speed metal forming, any additional parts, such as angles, flanges, bolts, swing arms, legs or other fastening or mounting means with which the motor housing is to be equipped, can be assembled therewith prior to metal forming so that a single forming operation suffices to rigidly join the main components of the motor and to simultaneously attach the additional parts. For example, these parts may be stuck beneath the edge of the bearing shields prior to completing the assembling work and applying the high-speed metal-forming method.

The invention will be further described with reference to embodiments of motors according to the invention illustrated by way of example on the accompanying drawing in which.

The same reference numerals are used in all illustrations for functionally corresponding components respectively.

Figure 1:
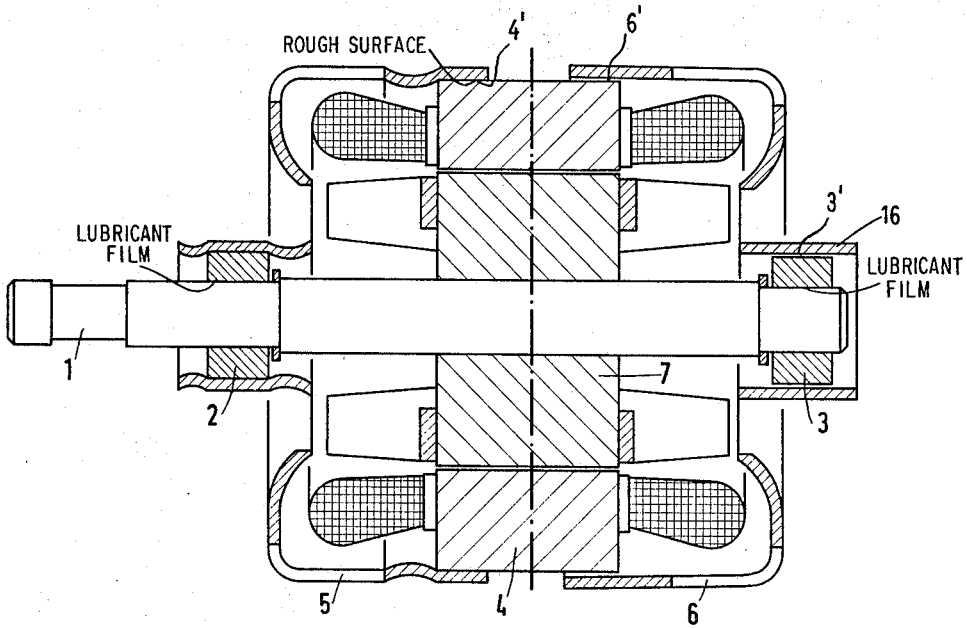
FIG. 1 is a longitudinal section through the single-phase squirrel-cage motor according to the invention.

FIG. 1 is subdivided by a vertical dot-and-dash line into two portions. In the right-hand portion, the bearing shield 6 of the illustrated motor is shown prior to completing the assembling work by the metal-forming method. The left-hand portion illustrates the motor after termination of the metal-forming method. Mounted on the shaft 1 of the motor are two cylindrical glide bearings 2 and 3, the bearing localities of the shaft being coated with a film of lubricant to prevent the bearings from being joined with the shaft. After assembling the bearings 2, 3 with the shaft 1, the two bearing shields 5 and 6 are stuck onto the stack 4 of stator laminations. It will be noted that originally there remains a gap 6' between each bearing shield and the stack 4 and a gap 3' between each bearing and the surrounding tubular holders 16 which form part of the respective shields.

The rotor 7 with the bearings 2 and 3 is to be accurately adjusted with respect to the stator stack 4. This is done, for example, with the aid of the conventionally used air gap needles which are inserted between rotor and stator to properly secure the accurate width and uniformity of the field gap. In contrast thereto, no adjusting is necessary with respect to the two bearing shields 5 and 6. Nor is any particular care required with respect to the production of these shields. They may be made from sheet metal by punching and drawing.

After the components are assembled as just described, the shields are conjointly subjected to compressing pressure by high-speed metal forming, preferably magnetic-pulse forming. This deforms the bearing shields inwardly at the peripheral edges seated upon the stator stack 4, resulting in a rigid and permanent junction between the stator and the bearing shields.

In most cases, the roughness of the stator surface 4' suffices to secure this result. For reliably obtaining an absolutely fast seating of the shields, the two marginal zones of the stator stack 4 may be provided with recesses 13 (FIG. 2) such as grooves, striations, bores or the like into which the material of the bearing shields is pressed, thus greatly increasing the frictional and shape-constrained seating and attachment. The unevenness in the marginal zone of the stator stack may be obtained by punched recesses in the stack laminations or by a special shape of the punched laminations. As shown in FIG. 2a, when providing the stator stack at the axial ends with sheets 14 of larger thickness, the diameter of these end sheets 14 may be made slightly larger than that of the other laminations, thus obtaining the desired uneven surface for securing a reliable attachment of the bearing shields. When producing the motor according to FIG. 1 in the manner described, the bearings 2, 3 in the bearing shields are rigidly attached to these shields simultaneously with the attaching of the bearing shields to the stator stack 4 in a single metal-forming operation.

With a short axial length of the stator stack, the bearing shields are preferably so dimensioned that they touch each other at the center plane (that is, at the vertical dot-and-dash line) of the stator.

Figure 2:
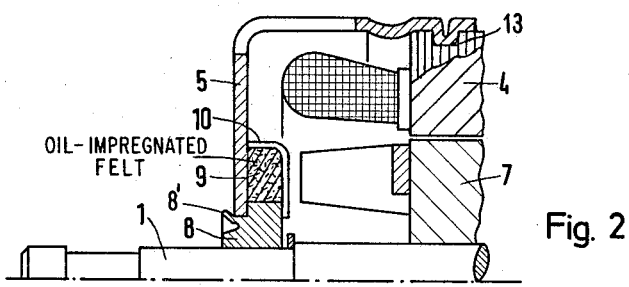
FIG. 2 is a partial and sectional view of a different embodiment of such a motor.
Figures 2A, 3:
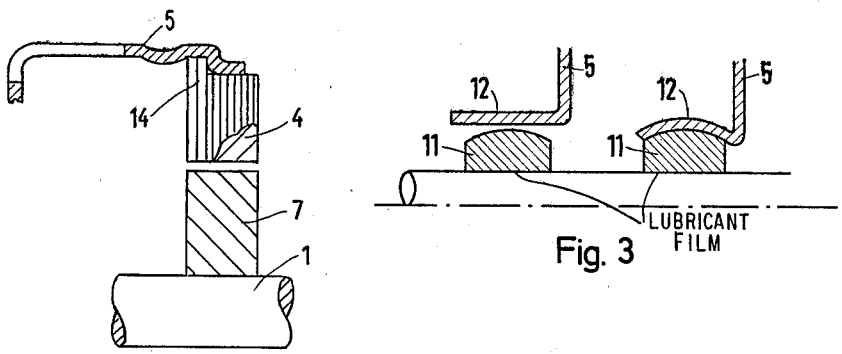
FIG. 2a is a fragmentary view of FIG. 2 showing a modification thereof.
FIG. 3 shows in section a modified form of the bearings to be fastened in the bearing shields of motors according to the invention.

In the embodiment illustrated in FIG. 2, the bearing has a peripheral marginal portion 8' which is crimped over an edge of the bearing shield. The bearing shield 5 has substantially the same cup-shaped configuration as the one shown in FIG. 1, except that the marginal portion 8' of bearing 8 is peripherally crimped over the shield edge defining the center opening of the shield. For prolonged useful life of the motor, a grease storage space 9 is formed around the riveted bearing 8 by means of an annular sheet-metal cover 10. The space 9 is filled with grease, oil-impregnated felt or the like lubricating material. The grease or oil then drains into the bearing 8 consisting of a slightly porous sintered metal, the lubricant drained being substantially equal to the actual consumption. As a result, the bearings require no maintenance for considerable lengths of time.

FIG. 3 shows a fragment of an embodiment in which calotte-type bearings 11 are employed instead of the cylindrical bearings shown in FIGS. 1 and 2. The left portion of FIG. 3 shows the calotte bearing 11 prior to the assembling and forming stage. The right-hand portion of FIG. 11 shows the completed bearing after the metal-forming stage. An originally cylindrical portion 12 of the bearing shield 5, when subjected to the metal-forming operation, is snugly and tightly forced against the spherical surface of the bearing calotte. To preserve the desired rotational adjustability of the bearing 11, the inner side of the circularly cylindrical portion 12 is coated with lubricant. The coating remains preserved during the metal-forming operation. Preferably the bearings 2 and 3 shown in FIG. 1 are also coated with lubricant, thus providing for protection from edging and excessive pressure concentration at the edges.

Relative to a high-speed metal-forming method suitable for the purposes of the invention, reference may be had, for example, to U.S. Patent 2,976,907 describing methods and devices for metal forming with the aid of pulsed magnetic fields, and to "Magnetic-Pulse Forming" by D. F. Brower, Paper No. 479B, published by Society of Automotive Engineers, Inc., 485 Lexington Ave., New York (1962).

To those skilled in the art it will be obvious from a study of this disclosure, that our invention is also applicable to generators and other rotary electrical machines and may be given embodiments other than particularly illustrated and described herein, without departing from the essential features of the invention and within the scope of the claims annexed hereto.

We claim:

1. In an electric rotary machine assembled by high-speed metal forming, which comprises a shaft, a rotor mounted on said shaft, a magnetically active stator of ring-shaped configuration coaxially surrounding said rotor, and two bearing shields located on axially opposite sides of said stator and having respective bearings in which said shaft is journalled, the improvement according to which each of said bearing shields comprises a cylindrical rim portion peripherally overlapping a marginal zone of said stator and being deformed peripherally at said zone around and toward said stator so as to be in formlocking engagement therewith and form a rigid deformation bond together therewith, whereby attachment of said shields to said stator by high-speed metal forming is afforded.

2. In an electric machine according to claim 1, said stator having an irregular peripheral surface in said marginal zone.

3. In an electric machine according to claim 1, said stator having recesses in said marginal zone, said recesses being engaged by the deformed rim portion of said bearing shield.

4. In an electric machine according to claim 1, said magnetically active stator being formed of a stack of sheet-metal laminations having surface irregularities in each of said marginal zones.

5. In an electric machine according to claim 4, said stator having end sheets of larger thickness than the laminations intermediate said end sheets, and said end sheets having a larger diameter than said intermediate laminations to thereby form said surface irregularities.

6. In an electric machine according to claim 5, said laminations having marginal recesses constituting said surface irregularities.

7. In an electric machine according to claim 1, at least one of said bearings having a peripheral crimped portion coaxially joining said bearing to its bearing shield.

8. In an electric machine according to claim 1, at least one of said bearing shields having a tubular portion coaxially surrounding one of said bearings and deformed peripherally around said bearing and thereby joined with said tubular portion.

9. An electric machine according to claim 8, comprising a lubricant film between said bearing and said shield portion, whereby said bearing remains capable of movement relative to said shield.

10. In an electric machine according to claim 9, said bearing having a substantially spherical outer surface so as to be capable of universal displacement relative to said shield.

11. The method of producing an electric machine in which two bearings shields comprise a cylindrical rim portion peripherally overlapping and deformation-joined with respective marginal zones of a ring-shaped stator, the machine having a rotor journalled in bearings mounted on said respective shields, which method comprises the steps of assembling the above-recited machine components while the rim portions of the respective shields remain in the substantially rough state, seating the rim portions with clearance upon the likewise rough marginal zones of the stator, then compressively deforming said rim portions by high-speed metal forming peripherally toward the stator and into rigid attachment thereto and form locking engagement therewith.

12. The method according to claim 11, which comprises loosely seating the bearings with peripheral clearance in the respective bearing shields when assembling the machine components, and joining the bearings with the bearing shields by the same metal-forming operation that attaches the shields to the stator.

13. The method according to claim 11, which comprises placing a film of lubricant between the shaft and the bearings prior to metal forming.

14. The method according to claim 12, which comprises placing a film of lubricant between the bearings and the shields prior to metal forming.

References Cited

UNITED STATES PATENTS

| | | | |
|---|---|---|---|
| 1,918,690 | 7/1933 | Engelhardt | 310—90 X |
| 2,959,696 | 11/1960 | Tupper et al. | 310—90 |
| 3,167,672 | 1/1965 | Tupper | 310—90 |
| 3,214,511 | 10/1965 | Franklin. | |
| 2,295,203 | 9/1942 | Darnell | 310—258 |
| 3,012,162 | 12/1961 | Rediger | 310—259 |
| 3,413,715 | 12/1968 | Latussek et al. | 29—596 |

FOREIGN PATENTS

| | | |
|---|---|---|
| 691,446 | 5/1953 | Great Britain. |

OTHER REFERENCES

"Magnetic Forming of Pressure Tight Joints," page 79, Metalworking Production, May 6, 1964.

WARREN E. RAY, Primary Examiner

U.S. Cl. X.R.

29—421, 596; 310—90, 258